United States Patent
Barnes et al.

(10) Patent No.: US 7,337,431 B1
(45) Date of Patent: *Feb. 26, 2008

(54) DISTRIBUTED LARGE-SCALE APPLICATION BENCHMARK SYSTEM

(75) Inventors: James D. Barnes, Overland Park, KS (US); Robin D. Katzer, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 756 days.

This patent is subject to a terminal disclaimer.

(21) Appl. No.: 10/745,212

(22) Filed: Dec. 23, 2003

(51) Int. Cl.
*G06F 9/45* (2006.01)
(52) U.S. Cl. .................................... 717/124
(58) Field of Classification Search ................. 717/124
See application file for complete search history.

(56) References Cited

U.S. PATENT DOCUMENTS

| | | | |
|---|---|---|---|
| 5,920,722 A | 7/1999 | Damron | 395/706 |
| 6,249,886 B1 | 6/2001 | Kalkunte | 714/47 |
| 6,449,739 B1 | 9/2002 | Landan | 714/47 |
| 6,625,648 B1 * | 9/2003 | Schwaller et al. | 709/224 |
| 6,704,883 B1 * | 3/2004 | Zhang et al. | 714/4 |
| 7,178,065 B2 * | 2/2007 | Dinker et al. | 714/41 |

OTHER PUBLICATIONS

Rajendra P. Cheedella, et al., *Data Loading Tool for Loading a Database*, filed Aug. 29, 2003, U.S. Appl. No. 10/652,264, Specification (26 pgs.) and Drawing (7 sheets).
Alfredo Edwin Gunara, et al., *Simulator Tool For Testing Software In Development Process*, filed Aug. 18, 2003, U.S. Appl. No. 10/643,328, Specification (32 pgs.) and Drawing (8 sheets).
Balagurunathan Balasubramanian, et al., *Method and Software for Testing and Performance Monitoring*, filed May 31, 2001, U.S. Appl. No. 09/871,304, Specification (43 pgs.) and Drawings (12 sheets).

* cited by examiner

*Primary Examiner*—John Chavis

(57) ABSTRACT

A system for testing computer software is provided that comprises a client module having a first interface to promote communication with software to be tested, the client module having instructions operable to test the software, an agent module operable on a first computer system to initiate the client module on the first computer system, a user interface adapted to receive input including test information, and a manager module coupled to the receive the input from the user interface and generate at least a portion of the instructions of the client module using a portion of the test information, the manager module operable to communicate the portion of the test instructions and the first interface to the first computer and further operable to communicate with the agent module to initiate the client module to test the software. A method for testing software is also provided.

22 Claims, 3 Drawing Sheets

DISTRIBUTED LARGE-SCALE APPLICATION BENCHMARK SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to testing computer software, and more particularly, but not by way of limitation, to a system and method for stress testing of software.

BACKGROUND OF THE INVENTION

A typical approach to testing computer programs or applications is to input test data to the application, capture the response of the application to this input, and determine if the response is correct given the known input. In some cases, an ordered sequence of input and output pairs may comprise a logically complete interaction, transaction, or session with the application under test. Some applications must be tested to assure they work properly when under the stress of heavy work loads. For example, it is not enough to assure that a web site server can handle one request correctly over a fifteen minute interval, it may be necessary to verify that the web site server can handle hundreds of requests per second from many clients without failing. Testing by placing a heavy work load on the application may be referred to as stress testing.

Software test drivers are frequently developed to support testing software applications. A test driver is a computer program which interacts with and probes the software under test to determine if it satisfies requirements. Software test drivers are often built to support a standard communication interface, for example, Java Message Service (JMS) messages, common object request broker architecture (CORBA) service object method calls, Java remote method invocation (RMI), UNIX socket communications, as a means to communicate with the software application under test.

SUMMARY OF THE INVENTION

The present embodiment provides a system for testing computer software. The system for testing computer software comprises a client module having a first interface to promote communication with software to be tested. The client module has instructions operable to test the software. An agent module is operable on a first computer system to initiate the client module on the first computer system. A user interface is adapted to receive input including test information. A manager module is coupled to receive the input from the user interface and generate at least a portion of the instructions of the client module using at least a portion of the test information. The manager module is operable to communicate the at least a portion of the test instructions and the first interface to the first computer and further operable to communicate with the agent module to initiate the client module to test the software.

In one embodiment a method for testing software is provided. The method for testing software comprises inputting, via an interface, instructions for testing software, and generating an adapter coupled to the instructions. The adapter is operable to communicate with the software to be tested. The method includes transmitting the adapter and instructions to a first computer system, and transmitting the adapter and instructions to a second computer system. The method includes providing an agent program on the first and second computers, where the agent program is in communication with the adapter and instructions. The method provides for sending a signal to the agent programs to initiate the instructions to test the software, and monitoring the progress of the instructions during testing the software, and displaying the test result.

In one embodiment a method for testing software using a testing framework system is provided. The method for testing software using a testing framework system comprises providing agent modules on a plurality of computers. The method provides for generating, using a graphical user interface, a first testing instruction for testing the software and further generating a first application program interface coupled to the first testing instruction. The method includes generating, using the graphical user interface, a second testing instruction for testing the software and further generating a second application program interface coupled to the second testing instruction. The method provides for transmitting the first testing instructions and first application program interface to a first group including at least some of the agents, and transmitting the first testing instructions and first application program interface to a second group including at least some of the agents. The method includes managing testing of the software using a manager module having the graphical user interface. The manager module in communication with the agent modules and operable to selectively initiate testing of the software by one or more of the agent modules.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

In a typical software development project little budget is allocated to developing software test drivers, and, consequently, software developers may quickly develop rudimentary software test drivers narrowly designed to test their own developed code. This code may be throw-away code. Throw-away code is code which may not be delivered as part of the software product itself and may not be used after the project passes beyond the software test phase and hence is thrown-away after completion of the project. While the investment in developing software test drivers may be small, throwing-away the software test driver code after completion of the project constitutes a waste of economic resources, and this waste accumulates across multiple projects.

Each test driver developer may design and implement a partial implementation of standard communication interfaces which suits their own specific testing needs but which may not be reused by others who may need a different subset of the features of the standard communication interface. Thus, much duplication of effort takes place which is a further waste of economic resources.

Throw-away software test drivers are often inflexible and designed to support a specific minimal test scenario. Narrow, inflexible software test drivers may discourage or hinder thorough testing of software.

Independent test groups may employ the software test drivers to conduct their test efforts. The tester must learn how to load, initialize, start, control, and extract results from each of the software test drivers. These operations may be completely different for software test drivers developed by different software developers, imposing a greater learning burden on the tester.

Figure 1:
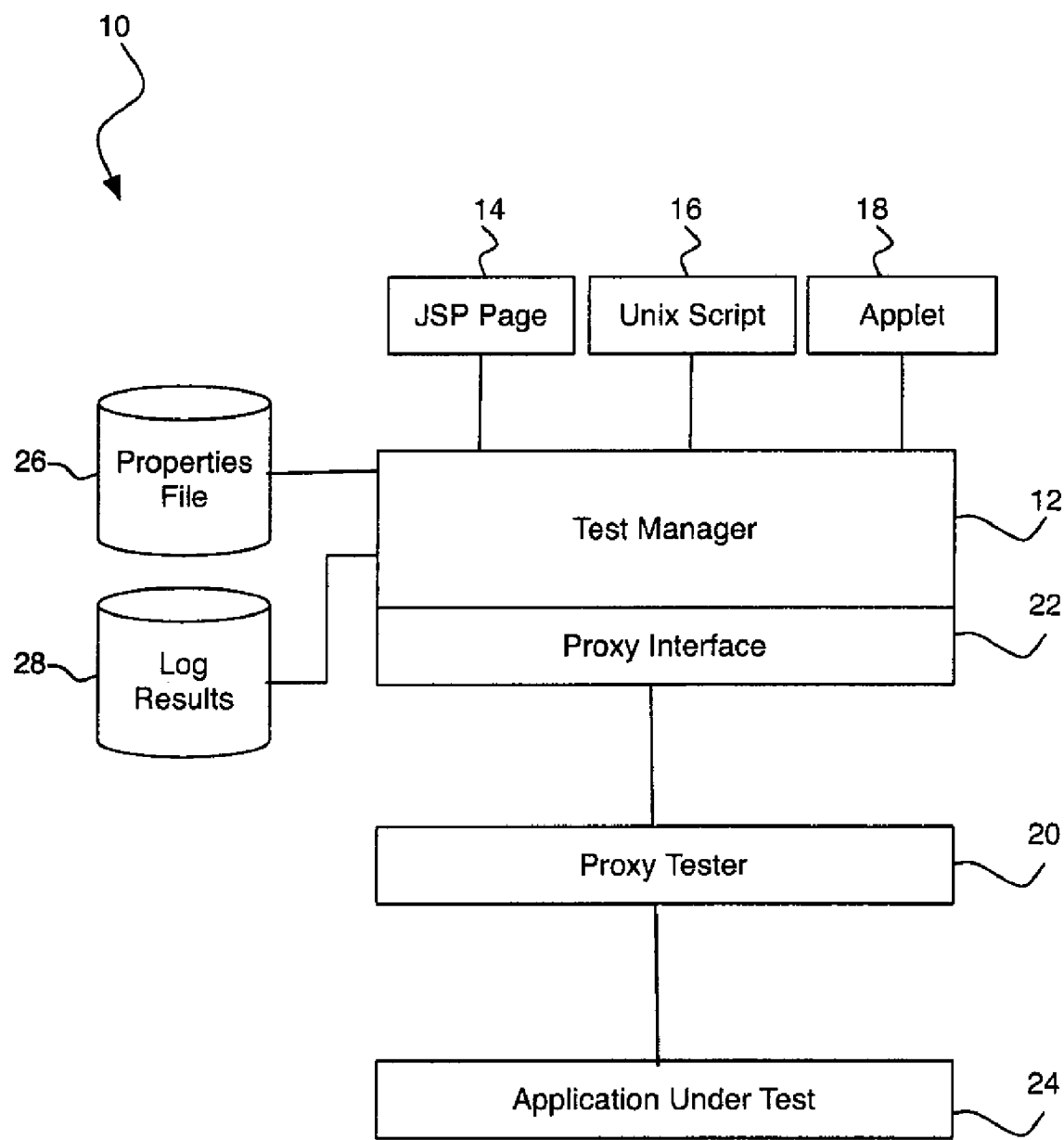
FIG. 1 depicts a block diagram of a software test framework according to one embodiment.

Turning now to FIG. 1 a block diagram depicts a test framework system 10 which overcomes some of the economic disadvantages associated with inflexible, narrowly functional, throw-away software test drivers. A test manager 12 is operable to receive user inputs from any of several user interfaces including a java server pages (JSP) interface 14, a UNIX script interface 16, and a java applet interface 18. Several different interfaces 14, 16, and 18, are provided to permit users to select the interface they prefer. Only one of these user interfaces is used during one testing session, and the user selects the user interface they prefer. The inputs from these interfaces 14, 16, and 18 provide commands and data to the test manager 12 to cause it to conduct testing of an application under test 24.

The test manager 12 is operable to communicate with a proxy tester 20 via a proxy interface 22. The proxy tester 20 implements a particular communication interface appropriate for communicating with the application under test 24. The proxy tester 20 is reusable from one test scenario to another, and is not modified to conduct a specific testing operation. The test manager 12 and the proxy tester 20 are computer programs which may execute on a general purpose computer system. The application under test 24 may be any computer software, computer program, computer software module, or computer software component. The application under test 24 may execute on a general purpose computer system. In some embodiments the application under test 24 may be a server application. General purpose computer systems are discussed in greater detail hereinafter.

Several different proxy testers 20 may be implemented such as an RMI proxy tester, a CORBA proxy tester, a java messaging service (JMS) proxy tester, a message queue (MQ) proxy tester, a hypertext markup language (HTML) transport protocol (HTTP) proxy tester, a web services proxy tester, a relational database management system (RDBMS) proxy tester, an IMS connect proxy tester, a Siebel proxy tester, and others as would be understood by those skilled in the art. As such, the proxy tester 20 may be operable to generate the proxy interface 22 based on a file wherein the file describes a communication mechanism from one of a Common Object Request Broker architecture (CORBA) interface description language, eXtensible Markup Language (XML), Hypertext Transport Protocol (HTTP), Java Remote Method Invocation (JRMI), structured query language (SQL), Siebel messages and MQ Series messaging service messages.

When communication with an application under test 24 does not employ a communication interface which is already implemented by one of the existing proxy testers 20, a special case proxy tester 20 may be implemented which is compatible with the proxy interface 22, and the proxy interface 22 may be modified to permit it to communicate with the new special case proxy tester 20.

When it is commanded by the interface 14, 16, or 18, to conduct a test, the test manager 12 reads a properties file 26 which instructs the test manager 12 how to test the application under test 24. The properties file 26 identifies which proxy tester 20 to use, defines a test scenario comprising what input to send and what output is expected, how many times to run the test scenario, and how much time delay to introduce between successive test scenarios. The properties file 26 provides set-up information necessary to find and access the machine on which the application under test 24 is executing including a userid, a password, and an internet protocol (IP) address. The properties file 26 to be employed, and hence the test scenario, is identified in the test command sent by the interface 14, 16, or 18. The test manager 12 reports the results of the testing in a log results file 28. The log results file 28 includes start times, stop times, success counts, and failure counts.

The test framework system 10 described above provides much functionality which can be reused wholly or in part from one project to the next. The properties file 26 must be developed, at least in part, for every new application under test 24. If the application under test 24 employs a new type of communications interface, a new proxy tester 20 must be developed. If, however, the application under test 24 can communicate with an existing proxy tester 20, no new proxy tester 20 need be developed. The remaining structure of the test framework system 10 is fully reusable. Some of the reusable features of the test framework system 10 may include facilities for writing results to the log results file 28 and creating timers to capture response time of the application under test 24. The test framework system 10 may eliminate much of the duplication of effort of software developers and conserve the value of test driver development so it can continue to provide return on the investment.

Figure 2:
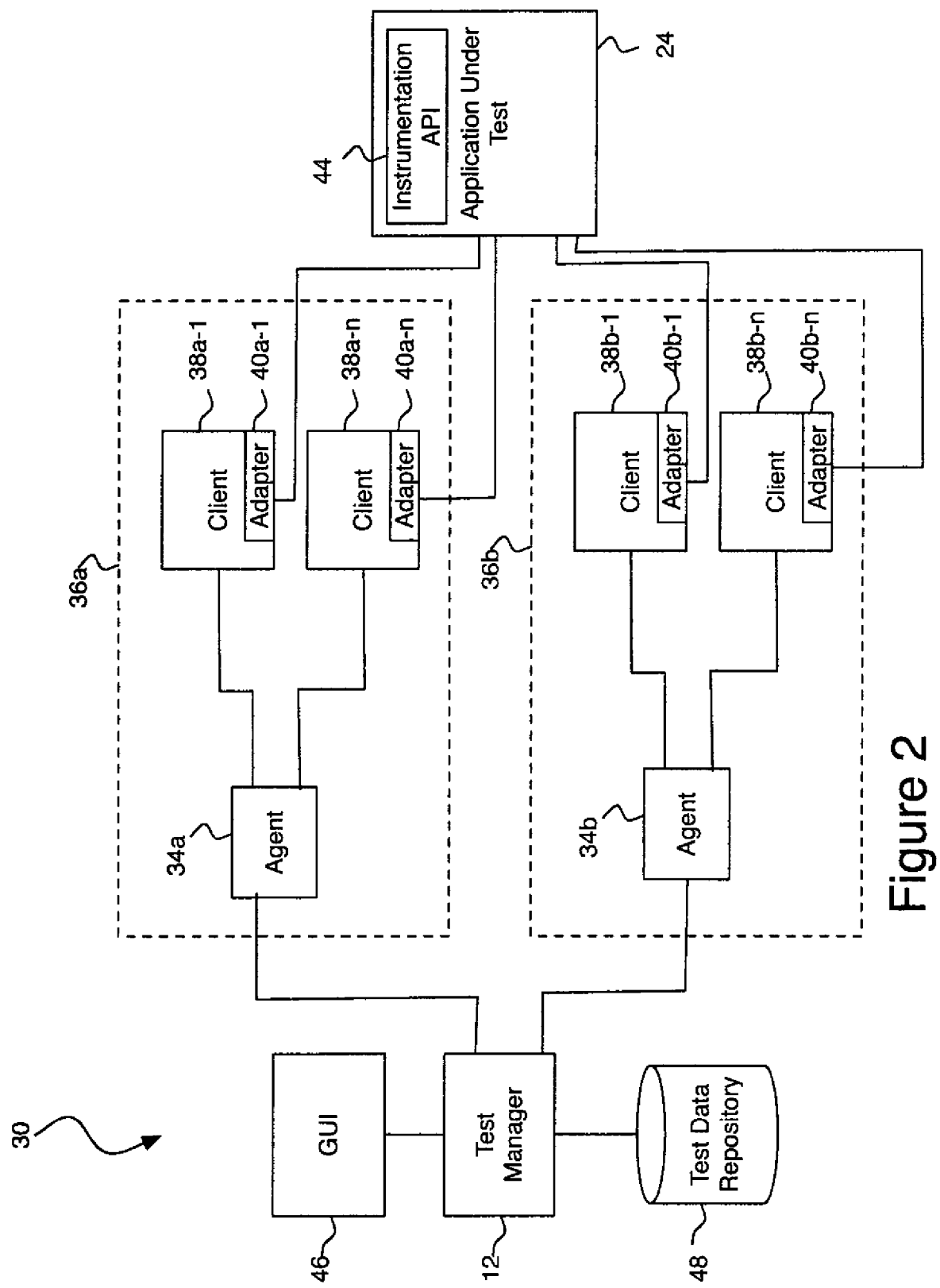
FIG. 2 depicts a block diagram of a software test framework according to the preferred embodiment.

Turning now to FIG. 2 a block diagram of the preferred embodiment of a test framework system 30 is depicted. The test manager 12 is operable to coordinate the software testing, to generate interface adapters 40 from interface definitions, and to generate test clients 38. The generation functions of the test manager 12 will be described after describing the test manager's 12 role in coordinating software testing. While it may be used to conduct general purpose testing, the test framework system 30 is particularly well suited to running multiple concurrent test clients with the purpose of stress testing or load testing a server application. In this use, the test framework system 30 supports executing a large number of test clients on multiple computers or testing nodes wherein the test clients concurrently send requests for service to the server application under test.

The test manager 12 provides a centralized mechanism to control all aspects of the software testing process. This is especially useful for the tester in that it alleviates the need for the tester to manually control many test clients running on many computers in order to conduct large scale testing. During software testing, the test manager 12 is in communication with a plurality of test agents 34a through 34b. While two test agents, 34a and 34b, are shown, it is understood that the test manager 12 may communicate with any number of test agents 34, including only one test agent 34. The test manager 12 is a computer program which may execute on a general purpose computer system. General purpose computer systems are discussed in greater detail hereinafter.

The test agent 34a is a computer program, module, or component which executes on a testing node 36a which is a general purpose computer system. Similarly, the test agent 34b executes on a testing node 36b. Typically one test agent 34 is installed on each testing node 36. The test agent 34 is an important component in most efficiently enabling the centralized coordination of testing through the test manager 12. The test agent 34 acts as the local representative of the test manager 12 on the testing node 36. The test agent 34 is operable to receive from the test manager 12 a sequence of instructions defining a test client 38, to instantiate a plurality of test clients 38a-1 through 38a-n (where n is an indefinite number corresponding to the number of the plurality of test clients 38a) on the testing node 36a, to communicate with the test clients 38a, to start the test clients 38a when so directed by the test manager 12, to stop the test clients 38a when so directed by the test manager 12, to receive test results from the test client 38a, and to relay these test results to the test manager 12. The test agents 34 are different instances of the same software. Multiple test clients 38 may be loaded and executed concurrently on a single testing node 36.

The test client 38 is a computer program, module, or component which executes on the testing node 36. The test client 38 is built by the test manager 12 to support a specific test scenario. How the test manager 12 builds test clients 38 will be described later. The test clients 38a contain an interface adapter 40a which supports communication between the test clients 38a and the software application under test 24. The test clients 38a contain instructions to send a sequence of inputs to the software application under test 24 and to receive the outputs of the software application under test 24 in response. The test clients 38a are operable to determine test pass/fail status and to report test results back to the test agent 34a. The test agent 34a relays the test results to the test manager 12.

The test manager 12 stores the test results in a test data repository 48. The test manager 12 also analyzes the test results and sends analysis summaries to a graphical user interface (GUI) 46 which displays the results in a variety of manners. The GUI 46 may display the results as static figures after the test runs have completed. This may involve listing the total number of test cycles completed, the total number of test failures which occurred, the total number of test successes which occurred, and the percentage of test case success.

For example, the test manager 12 may instruct test agents 34a and 34b to each start five test clients 38 on their test nodes 36a and 36b, respectively. These ten test clients 38 would report their test results back to test agents 34a and 34b. The test manager 12 would request the test results from the test agents 34a and 34b which would report these test results back to the test manager 12. The test manager 12 would analyze and collate these test results. For example, a test may be summarized as comprising 10,000 test cycles, 100 failures, 9,900 successes, and a success rate of 99%.

The GUI 46 may also display test results which update, as testing continues. The GUI 46 may display a current data throughput rate, a peak data throughput rate achieved, a current transaction rate, and a peak transaction rate achieved. The GUI 46 may display an indication of the percent of test completeness for each testing node 36 and/or for each test client 38. The display of dynamically updating test results may be referred to as live feedback.

The GUI 46 may support displaying the results of several testing sessions together to support test result interpretation. For example, displaying the results of a test which employed 100 test clients 38, displaying the results of a test which employed 200 test clients 38, and displaying the results of a test which employed 300 test clients 38 may reveal when the application under test 24 reaches a performance saturation point.

In some embodiments, the application under test 24 may be built to include an instrumentation application programming interface (API) 44 which provides the application under test 24 the capability of reporting method start time and method stop time back to the test client 38a. This instrumentation API 44 may also be referred to as a monitor component. The instrumentation API 44 is used by the application under test 24 to report method start times and method complete times from the view point of the application under test 24. This process of reporting method start and completion times may provide a more accurate measurement of the performance of the application under test 24 than the measurement which the client 38a can determine. If the test client 38a determines method start and completion times based on when it invokes or calls a method on the application under test 24 versus when it receives the result of the method call, the overhead of any middleware between the test client 38a and the application under test 24 contributes an unknown delay to the method execution cycle. The instrumentation API 44 may be employed to measure the overhead of middleware, because the difference between the execution cycle time observed by the test client 38a and the execution cycle time reported by the instrumentation API 44 may be attributed to the overhead due to the middleware. The ability to measure middleware overhead is a useful capability.

In some embodiments there may be a plurality of test agents 34a through 34b controlling a plurality of test clients 38a through 38b with test agents 34 and test clients 38 executing on test nodes 36. The number of test agents 34, the number of test clients 38, and the number of test nodes 36 are defined by a test scenario defined via the GUI 46 prior to test start. Placing a heavy load on the application under test 24 during stress testing may require many test clients 38 concurrently to send requests to the application under test 24. In the preferred embodiment, the number of test clients 38 and the number of test nodes 36 to be employed during testing are defined dynamically in the test scenario. In alternative embodiments, however, the number of test nodes 36 to be employed during testing may be defined statically, or combinations of some being defined statically and other being defined dynamically. This provides extensive flexibility to dynamically increase, such as before or during test, the number of test clients 38 and the instructions directed to the application under test 24. Such functionality allows for load testing the application under test 24 to failure or near failure and easily retest with additional test clients 38. Further, the ability to monitor, real-time or otherwise, the time or processing resources consumed during the test enables testers to focus or refine the test to stress or otherwise test different aspects or points of the application under test 24 or related components or systems.

In some embodiments the number of test clients 38 and the number of test nodes 36 may be redefined by the GUI 46 while a testing session is in progress. Live feedback, discussed above, may be used along with the capability to redefine the number of test clients 38 during a testing session to identify the maximum sustainable load which the application under test 24 can handle. For example, the user, employing the GUI 46 to command the test manager 12, may continue adding test clients 38 which send requests to a web server application under test 24 until the test clients 38 begin to experience time-outs, test failures, due to the application under test 24 not being able to handle requests in a timely fashion.

The test manager 12 is further operable to generate the interface adapters 40 from definitions of the associated APIs including, for example, Java 2 Platform, Enterprise Edition (J2EE) Enterprise Java bean classes; structured query language (SQL) files; and interface definition language (IDL) files used to define CORBA APIs. These files and classes are stored in the test data repository 48. The test manager 12 reads the API files from the test data repository 48, parses the API definitions in the API files, and generates therefrom executable interface adapters 40. These interface adapters 40 are built into or configured into the test clients 38 to enable them to communicate with the application under test 24. The interface adapters 40 for application specific, non-standard APIs, not generated by the test manager 12, may be developed by software developers and are stored in the test data repository 48 along with the automatically generated interface adapters 40.

The test manager 12 is further operable to generate the test client 38 from user input provided via the GUI 46 during a test scenario building session. When starting a test scenario building session, the GUI 46 receives communication from the test manager 12 cataloging available APIs, methods or functions which the API makes available, argument names within the methods, and data types of the argument names within the methods. A method or function is an operation which a computer program or application can perform for a requestor who invokes the method or function. This invoking is sometimes referred to as calling the method or calling the function. An example of a function might be "getCustomerAccountNumber." To invoke this function a program may execute the method call "getCustomerAccountNumber ("Doe", "John")" where Doe is the last name of the customer and John is the first name of the customer.

The GUI 46 guides the user through the complete process of building the test scenario. The GUI 46 displays the available APIs to allow selection of one of the APIs. After an API is selected, the methods which may be called for the API are displayed. The user builds a test scenario by selecting API methods to be called, providing appropriate arguments to the API methods, ordering the API method calls in the desired sequence. One may provide specific arguments to method calls or may ask the test manager 12 to generate arguments, such as incrementing an integer to provide a unique key for a method call that is going called repeatedly.

The GUI 46 provides a text input box to enable the user to define the expected response of the application under test 24. The GUI 46 provides an input box to enable the user to define the number of times the test client 38 should repeat the test scenario. The GUI 46 provides an input box to enable the user to define a period of time during which the test client 38 should continuously repeat the test scenario. The GUI 46 provides a means for the user to define the test nodes 36 to be employed in testing and to define the number of test clients 38 to execute on each identified test node 36. In this way a user can completely define a complex test scenario for a test client 38.

When the user directs the test client 38 to be generated, the GUI 46 communicates the input to the test manager 12, and the test manager 12 generates the test client 38 defined by the test scenario created using the GUI 46. The generation of the test client 38 includes building an interface adapter 40 into the test client 38. The test manager 12 determines what interface adapter 40 to build into the test client 38 based on the API whose methods are invoked in the test scenario. The test manager 12 may also generate test clients 38 from extensible markup language (XML) based configuration files. When the test scenario is built the user names and saves the test scenario for later invocation.

The GUI 46 may support composing test scenarios out of multiple distinct test clients 38. For example, a test scenario might be defined which calls for ten test clients 38a to execute on test node 36a where the test client 38a behavior is to repeatedly write data to the application under test 24 and also calls for ten test clients 38b to execute on test node 36b where the test client 38b behavior is to repeatedly read data from the application under test 24.

The test manager 12 may, in some embodiments, be decomposed into several distinct modules which support the different functions of the test manager 12.

Figure 3:
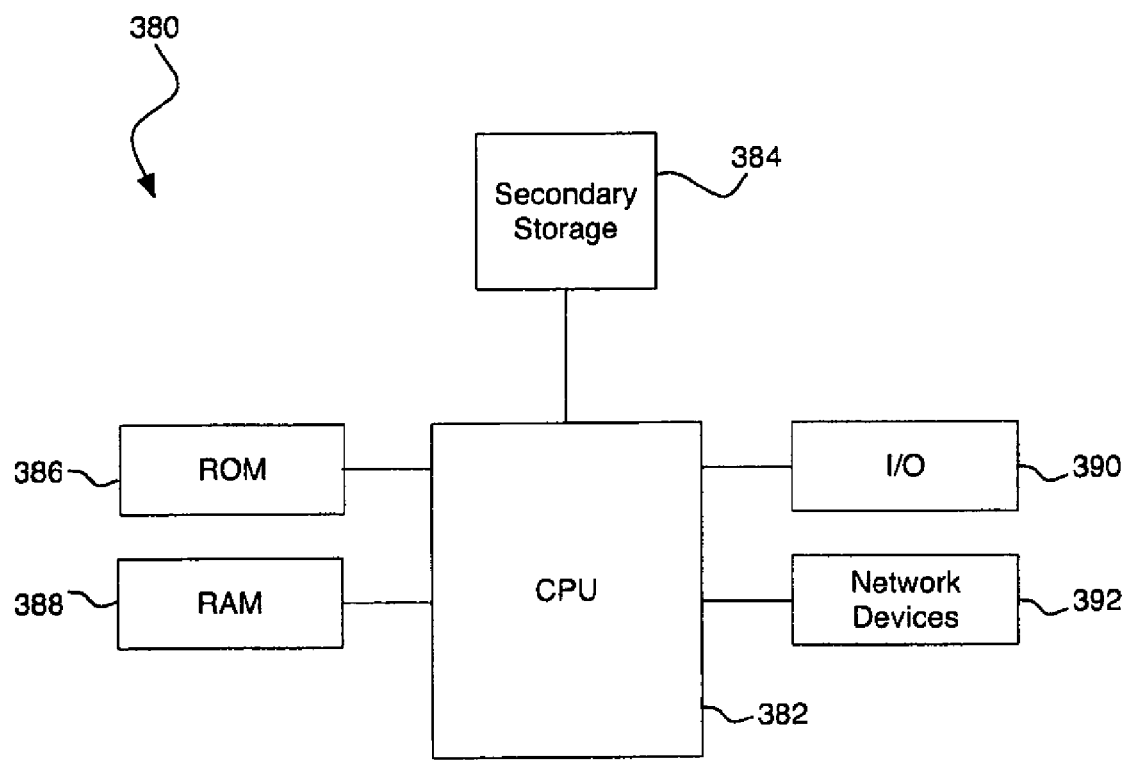
FIG. 3 illustrates an exemplary general purpose computer system suitable for implementing the several embodiments of the software test framework.

The test framework systems 10 and 30 described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, keyboards, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

The test framework system 30 disclosed above provides a number of useful facilities to the software tester. The test frameworks system 30 spares the software developer the work of developing a portion of a standard API to support communication with the application under test. Because the whole API is implemented the tester may be inclined to more thoroughly test the application under test 24 than if only a partial API were implemented in a throw-away test driver. The test framework system 30 provides a common look and feel for testers. Testers need not learn to use several different test scripts to test applications for every new product development cycle: they need only learn to employ and operate the test framework system 30 and the learning can be employed across multiple product development cycles. The test framework system 30 provides support for evaluation of middleware products. The test framework system 30 relieves the tester of transferring test client 38 executables to each test node 36 and then manually starting and stopping each test client 38 instance.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system for testing computer software, comprising:
    a client module having a first adapter interface in communication with software to be tested, the client module having instructions to test the software;
    an agent module stored on a first computer system to initiate the client module on a first computer system, wherein the agent module is in communication with the first adapter interface and the instructions;
    a user interface adapted to receive input including test information;
    a manager module coupled to receive the input from the user interface and generate at least a portion of the instructions of the client module using at least a portion of the test information, the manager module generating the client module and the first adapter interface, the manager module communicating the at least a portion of the test instructions and the first adapter interface to the first computer system and further communicating with the agent module to initiate the client module to test the software.

2. The system of claim 1, wherein the manager module is operable on a second computer system.

3. The system of claim 1, wherein the manager module is coupled to at least the portion of the instructions to the first interface.

4. The system of claim 3, wherein the first interface is further defined as an adapter to promote communication with the software to be tested and wherein the manager module generates the client module.

5. The system of claim 1, wherein the manager module generates at least a portion of the first interface.

6. The system of claim 5, wherein the manager module generates at least a portion of the first interface based upon the software to be tested.

7. The system of claim 1, further comprising an instrumentation application program interface coupleable to the software to be tested to promote communication with the client module, the instrumentation application program interface obtains data during testing of the software to be tested.

8. The system of claim 1, wherein the user interface is further displays software test results.

9. The system of claim 1, wherein the manager module generates the first interface based on a file.

10. The system of claim 9, wherein the file describes a communication mechanism from one of a Common Object Request Broker Architecture Interface Description Language, eXtensible Markup Language, HyperText Transport Protocol, Java Remote Method Invocation, Structured Query Language, and Siebel messages.

11. The system of claim 1, wherein the user interface displays a percentage complete of the client module testing of the software.

12. The system of claim 11, wherein the user interface graphically displays test results.

13. The system of claim 1, further comprising a plurality of agent modules operable on a plurality of computer systems and wherein the manager module generates and transmits at least a portion of the client module to the plurality of computer systems and communicate with the plurality of agents to initiate a new instance of the client module on each of the plurality of computer systems.

14. The system of claim 1, wherein the agent module starts, stops, and receives test results from the client module.

15. A method for testing software, comprising:
    inputting, via an interface, instructions for testing software;
    generating an adapter coupled to the instructions, the adapter operable to communicate with the software to be tested;
    transmitting the adapter and instructions to a first computer system;

transmitting the adapter and instructions to a second computer system;

providing an agent program on the first and second computers, the agent program in communication with the adapter and instructions;

sending a signal to the agent programs to initiate the instructions to test the software;

monitoring the progress of the instructions during testing the software; and displaying the test result.

16. The method of claim 15, wherein generating the adapter further comprises:

identifying the software to be tested;

providing a file having information for building the adapter; and generating the adapter based on the file.

17. The method of claim 15, further comprising:

providing a monitor component coupled to the software to be tested, the software to be tested operable on a third computer;

providing a middleware between the third computer and at least one of the first and second computers;

obtaining a first test information from the monitor component; and obtaining a second test information from at least one of the plurality of instructions and agents.

18. The method of claim 17, further comprising analyzing the middleware based on the first and second test information.

19. The method of claim 15, further comprising:

providing the software on a third computer; and analyzing a utilization component of at least one of the first, second, and third computers.

20. A method for testing software using a testing framework system, comprising;

providing agent modules on a plurality of computers, wherein each agent module is in communication with an application program interface and at least one testing instruction;

generating, using a graphical user interface, a first testing instruction for testing the software and further generating a first application program interface coupled to the first testing instruction, the first application program interface operable to communicate with the software;

generating, using the graphical user interface, a second testing instruction for testing the software and further generating a second application program interface for monitoring the second testing instruction the second application program interface operable to communicate with the software;

transmitting the first testing instruction and first application program interface to one or more of the agent modules on a first set of the plurality of computers, wherein the one or more of the agent modules on the first set of the plurality of computers are in communication with the first application program interface and the first testing instruction;

transmitting the second testing instruction and second application program interface to one or more of the agent modules on a second set of the plurality of computers, wherein the one or more of the agent modules on the second set of the plurality of computers are in communication with the second application program interface and the second testing instruction;

managing testing of the software using a manager module having the graphical user interface, the manager module in communication with the agent modules and selectively initiates testing of the software by one or more of the agent modules.

21. A method of dynamically testing software using a test framework system, comprising:

providing agent modules on a plurality of computers, the agent modules testing software using test instructions, the agent modules in communication with an adapter and the test instructions;

providing a manager module transmitting the test instructions to the agent modules and further selectively initiating testing of the software by one or more of the agent modules, wherein the manger module generates the adapter coupled to the test instructions, the manager module transmits the adapter and the test instructions to the plurality of computer systems, and wherein the adapter communicates with the software;

testing the software by a first group of agent modules;

monitoring testing via a graphical user interface monitoring the progress of the test instructions by the first group of agent modules; and dynamically initiating testing of the software by a second group of the agent modules during testing of the software by the first group of the agent modules.

22. The method of claim 21, wherein the method further includes:

generating the test instruction for testing the software and an application program interface coupled to the test instruction using at least a second graphical user interface coupled to the manager module;

transmitting the test instruction and the application program interface coupled to the test instruction to at least some of the agent modules; and terminating, during testing, at least one of the agent modules associated with the first group of agent modules.

* * * * *